United States Patent
Salganov (10) Patent No.: US 10,363,503 B1
(45) Date of Patent: Jul. 30, 2019

(54) FOLDABLE MULTI-STAGE WATER FILTER SYSTEM

(71) Applicant: Marvin Salganov, Davie, FL (US)

(72) Inventor: Marvin Salganov, Davie, FL (US)

(*) Notice: Subject to any disclaimer, the term of this patent is extended or adjusted under 35 U.S.C. 154(b) by 0 days.

(21) Appl. No.: 16/165,347

(22) Filed: Oct. 19, 2018

(51) Int. Cl.
B01D 35/30 (2006.01)
B01D 29/56 (2006.01)
C02F 9/00 (2006.01)
C02F 1/00 (2006.01)

(52) U.S. Cl.
CPC .......... *B01D 35/303* (2013.01); *B01D 29/56* (2013.01); *C02F 9/005* (2013.01); *B01D 2201/29* (2013.01); *B01D 2201/4038* (2013.01); *C02F 1/001* (2013.01); *C02F 2201/006* (2013.01); *C02F 2201/007* (2013.01); *C02F 2301/08* (2013.01)

(58) Field of Classification Search
CPC .............. B01D 35/303; B01D 29/56; B01D 2201/4038; B01D 2201/29; C02F 9/005; C02F 1/001; C02F 2201/006; C02F 2201/007; C02F 2301/08
USPC .... 210/232, 195.1, 239, 240, 241, 249, 252, 210/255, 261, 282, 335, 357, 440, 443, 210/444, 459, 489
See application file for complete search history.

(56) References Cited

U.S. PATENT DOCUMENTS

| | | | |
|---|---|---|---|
| 4,136,034 A * | 1/1979 | Grosshandler | B01D 29/96 210/346 |
| 4,816,149 A | 3/1989 | Wekell | |
| 5,320,752 A | 6/1994 | Clack et al. | |
| 5,785,848 A | 7/1998 | Strand | |
| 6,337,015 B1 | 1/2002 | Poirier | |
| 6,830,661 B1 | 12/2004 | Land | |
| 7,067,054 B2 | 6/2006 | Fritze | |
| 7,217,343 B2 | 5/2007 | Land | |
| 9,670,076 B2 | 6/2017 | Rajan et al. | |
| 9,855,519 B2 | 1/2018 | Rocklitz | |
| 2002/0030008 A1 | 3/2002 | Brunner et al. | |
| 2007/0186775 A1 | 8/2007 | DiPrizo et al. | |

(Continued)

FOREIGN PATENT DOCUMENTS

WO 2005030657 4/2005

OTHER PUBLICATIONS

Hydrapak, "Shape-Shift™ 2 L", hydrapak.com/shop/reservoirs/shape-shift-2, downloaded on Jun. 6, 2018, pp. 1-5.

(Continued)

*Primary Examiner* — Madeline Gonzalez
(74) *Attorney, Agent, or Firm* — The Concept Law Group; Scott D. Smiley; Scott M. Garrett (57) ABSTRACT

A reconfigurable foldable water filter system includes a plurality of filter units. Each filter unit includes a filter cartridge receiver that can accept and retain a water filter cartridge which includes a water filter. Both the well of each filter cartridge receiver and each filter cartridge are have a rectangular horizontal cross section. The filter cartridge receivers are joined together at corresponding corners, consecutively, in a series in a way that allows the filter cartridge receivers to pivot with respect to each other about the corresponding corners where they are joined. This allows the series of filter units to be arranged in a flat configuration or a folded configuration.

20 Claims, 9 Drawing Sheets

(56) References Cited

U.S. PATENT DOCUMENTS

2015/0096937 A1    4/2015   Munro
2015/0101987 A1    4/2015   Yeh et al.
2017/0008774 A1    1/2017   Mitchell et al.

OTHER PUBLICATIONS

Amazon, "Miniwell Collapsible Water Filter Bottle buy Personal 2-Stage Filtration System" https://www.amazon.com/miniwell-Collapsible-Personal-Filtration-Survival/dp/B079FQGD6H, downloaded on Jun. 6, 2018, pp. 1-9.

* cited by examiner

FOLDABLE MULTI-STAGE WATER FILTER SYSTEM

FIELD OF THE INVENTION

The present invention relates generally to water filter systems, and, more particularly, relates to a water filter system that can be configured in a flat configuration or folded in a compact configuration.

BACKGROUND OF THE INVENTION

Water filters are in widespread use for filtering tap water for drinking and making ice, particularly in conjunction with home refrigerator appliances. Many refrigerator units have ice makers and cold water dispensers and use a water filter between the water source and the refrigerator. Typical water filters for these applications are single stage, with the water passing through the filter to remove sediment and some of the chemicals present in tap water. Some refrigerators have filters that are mounted in a location such that they are accessible from the inside of the refrigerator, or in an access location outside the main compartment of the refrigerator.

Some refrigeration units that have become popular with homeowners are built in to the kitchen cabinetry. These units are not moveable, so a person can only access the unit in the main compartment or in associated access locations. Built in refrigerator units typically have access spaces for servicing components such as the compressor. These access spaces can also be used to house a conventional single stage water filter for filtering water dispensed at the refrigerator and for making ice.

A problem with conventional single state filters is that they typically remove chlorine, from the water. While this can improve the taste of drinking water, it is not filtered to the level of bottled water, which many people have become accustomed to drinking. Additional stages of filters, using different types of filtration, are needed to reproduce the taste and quality of bottled water. However, conventional water filters are not configured in a way that allows them to be conveniently mounted and placed in the available space provided with modern refrigerators. The lack of space in these access locations tends to preclude the installation of additional filtration stages.

Therefore, a need exists to overcome the problems with the prior art as discussed above.

SUMMARY OF THE INVENTION

The invention provides a foldable and reconfigurable water filter system that overcomes the hereinafore-mentioned disadvantages of the heretofore-known devices and methods of this general type and that configures a filter into a series of filter units that are moveable with respect to each other, allowing the filter system to be configured in an elongated configuration or folded into a compact configuration. This allows the same filter system to by physically configured or reconfigured into an optimum form factor for locating the filter system, for example, in a compressor access space, behind a refrigerator, or anywhere else a user may wish to place the foldable filter system, such as on top of a refrigerator, or inside kitchen cabinets located above a refrigerator.

Embodiments of the inventive disclosure provide a reconfigurable foldable water filtration system that can include a plurality of filter cartridge receivers. Each filter cartridge receiver has a filter cartridge well that has a rectangular cross section with two opposing long sides and two opposing short sides. The plurality of filter cartridge receivers are joined in a series at corresponding corners of adjacent filter cartridge receiver wells. The filter cartridge receivers are joined in a manner that allows the filter cartridge receivers to move relative to each other about a vertical axis of a joint at the corresponding corners. The plurality of filter cartridge receivers are alternatively configurable in a flat configuration and a folded configuration, and are moveable between the flat and folded configurations. In the flat configuration the plurality of filter cartridge receivers are arranged in a line with their long sides parallel to the line, and in the folded configuration the plurality of filter cartridge receivers are arranged in a line with their short sides parallel to the line.

In accordance with another feature, the plurality of filter cartridge receivers includes at least three filter cartridge receivers.

In accordance with another feature, each filter cartridge receiver in the at least three filter cartridge receivers in the series between a first filter cartridge receiver and a last filter cartridge receiver in the series is j oined to adjacent ones of the at least three filter cartridge receivers at alternating corners in an accordion arrangement.

In accordance with another feature, each one of the plurality of filter cartridge receivers has a top portion which includes an input connector and an output connector.

In accordance with another feature, the input and output connectors of each filter cartridge receiver are vertically oriented with respect to the filter cartridge well, and are swivelable about a vertical axis.

In accordance with another feature, there is further included a spacer formed on an outside of the filter cartridge well on each one of the plurality of filter cartridge receivers, and the spacer is positioned on a side of the filter cartridge well opposite the corresponding corner that is joined to another of the plurality of filter cartridge receivers.

In accordance with another feature, the filter cartridge receivers are fabricated of a polymeric material.

In accordance with another feature, each one of the plurality of filter cartridge receivers has a top portion which includes opposing retention release buttons which are configured to release a filter cartridge being retained in the filter cartridge well.

In accordance with another feature, the adjacent filter cartridge receivers in the series are joined by captured hinges.

Embodiments of the inventive disclosure further provide a foldable water filtration system that can include a plurality of filter cartridge receivers. Each one of the filter cartridge receivers have adjoining sides extending upwards from a bottom to a top portion, thereby forming a rectangular filter cartridge well therein that is open at the bottom and that is configured to receive a filter cartridge. The sides of each filter cartridge form corners where adjoining sides meet. The plurality of filter cartridge receivers are joined together in a series by hinge features formed at corresponding corners on adjacent filter cartridge receivers in the series, allowing the plurality of filter cartridge receivers to move with respect to each other about the hinge features The hinge features are disposed on the plurality of filter cartridge receivers in an alternating arrangement that allows the plurality of filter cartridge receivers to be reconfigurable into a flat configuration that maximizes a length of the series, or a folded configuration that minimizes the length of the series.

In accordance with another feature, the plurality of filter cartridge receivers comprises at least three filter cartridge receivers.

In accordance with another feature, each filter cartridge receiver in the at least three filter cartridge receivers in the series between a first filter cartridge receiver and a last filter cartridge receiver in the series is joined by the hinge features to adjacent ones of the at least three filter cartridge receivers at alternating corners.

In accordance with another feature, the top portion of each of the plurality of filter cartridge receivers includes an input connector and an output connector.

In accordance with another feature, the input and output connectors are vertically oriented with respect to the filter cartridge well, and are swivelable about a vertical axis.

In accordance with another feature, the system further includes a spacer formed on an outside of the filter cartridge well on each one of the plurality of filter cartridge receivers, and the spacer is positioned on a side of the filter cartridge well opposite the corresponding corner that is joined to another of the plurality of filter cartridge receivers by the hinge features.

In accordance with another feature, each of the plurality of filter cartridge receivers are fabricated of a polymeric material.

In accordance with another feature, the top portion of each one of the plurality of filter cartridge receivers includes opposing retention release buttons which are configured to release a filter cartridge being retained in the filter cartridge well.

Embodiments of the inventive disclosure further provide a foldable water filtration system that includes a plurality of filter cartridge receivers, each having a vertically oriented filter cartridge well formed by contiguous sides extended from an open bottom upward to a top portion. The plurality of filter cartridge receivers can be joined together in a series by hinge features at corresponding corners of successive and adjacent ones of the plurality of filter cartridge receivers. The hinge features alternate sides at each successive connection point between filter cartridge receivers in the series.

In accordance with another feature, the plurality of filter cartridge receivers are movable about the hinge features to allow the plurality of filter cartridge receivers to be alternatively configured into a flat configuration that maximizes a length of the series, or a folded configuration that minimizes the length of the series.

In accordance with another feature, the top portion of each of the plurality of filter cartridge receivers includes an input connector and an output connector.

Although the invention is illustrated and described herein as embodied in a reconfigurable water filter system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the long sides of the filter cartridge receivers. Those skilled in the art can understand the specific meanings of the above-mentioned terms in the embodiments of the present invention according to the specific circumstances

BRIEF DESCRIPTION OF THE DRAWINGS

The accompanying figures, where like reference numerals refer to identical or functionally similar elements throughout the separate views and which together with the detailed

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The disclosed foldable water filter system solves the problem of providing filtration for built-in refrigeration units by using a series of filter cartridge receivers that are joined together in a foldable arrangement. This allows the filter system to be folded into a compact form factor that can fit, for example, into the compressor access space of a built-in refrigerator unit. However, in other applications, the inventive foldable filter system can be unfolded into a flat configuration for placement in narrow spaces. Furthermore, by having several filter cartridge receivers, each filter cartridge receiver in the series can hold a filter for a different type of filtration to provide multi-stage filtration.

In some embodiments, the present invention provides a novel and efficient reconfigurable foldable water filter system that allows the user to optimize the physical configuration of the water filter system to fit into a given location. Embodiments of the invention provides a plurality of filter cartridge receivers that are joined together in a series and that can be configured into a flat configuration or a folded configuration. Each filter cartridge receiver can have a filter cartridge well that has a rectangular cross section with two opposing long sides and two opposing short sides. The plurality of filter cartridge receivers can be joined in a series at corresponding corners of adjacent filter cartridge receiver wells. The filter cartridge receivers are joined in a manner that allows the filter cartridge receivers to move relative to each other about a joint, such as a hinge, at the corresponding corners. The plurality of filter cartridge receivers can be alternatively configurable in an elongated configuration and a folded compact configuration and moveable between the elongated and compact configurations. In the elongated configuration the plurality of filter cartridges are arranged in line with their long sides parallel to the line, and in the compact configuration the plurality of filter cartridge receivers are arranged in line with their short sides parallel to the line.

Figure 1:
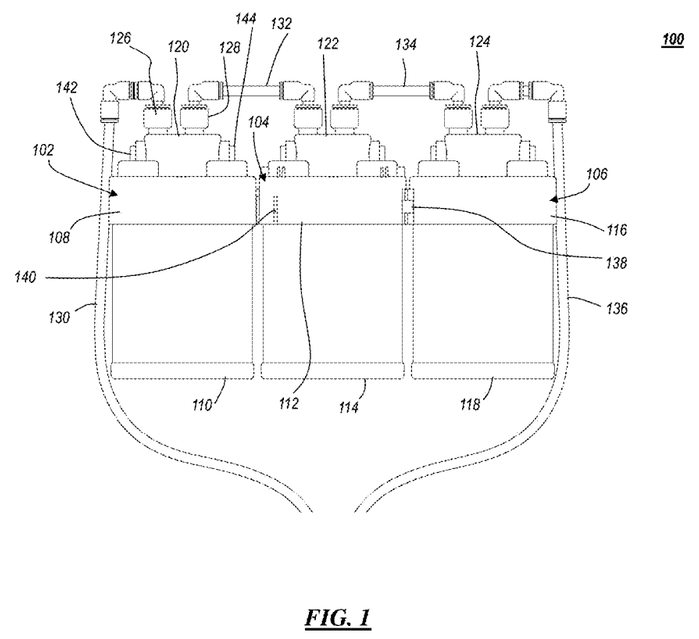
FIG. 1 is an elevational side view of a reconfigurable foldable water filter system in an elongated or flat configuration, in accordance with some embodiments.
Figure 3:
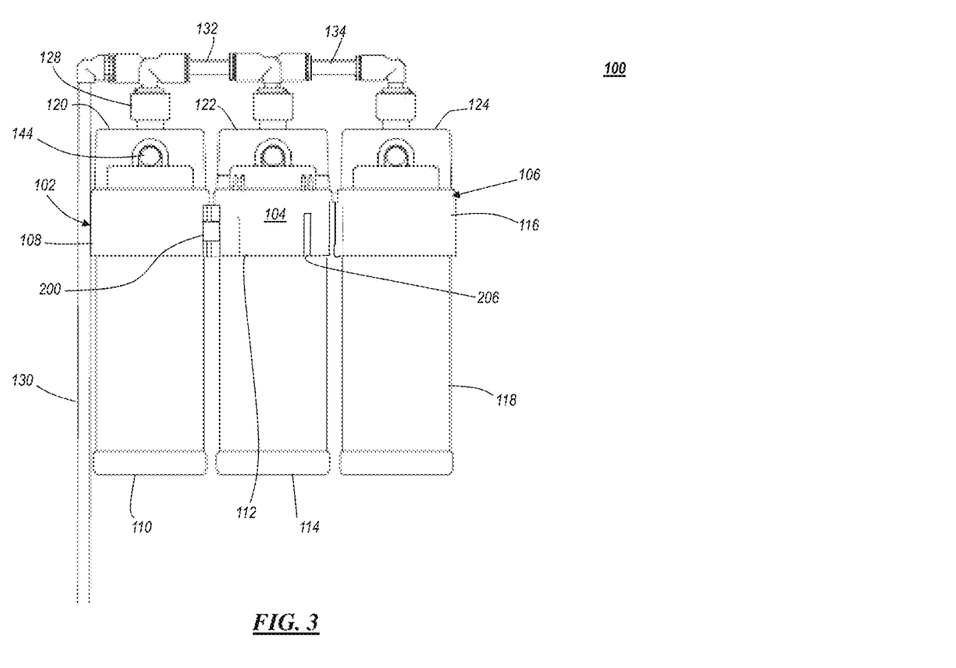
FIG. 3 is an elevational side view of a reconfigurable foldable water filter system folded in a compact configuration, in accordance with some embodiments.
Figure 4:
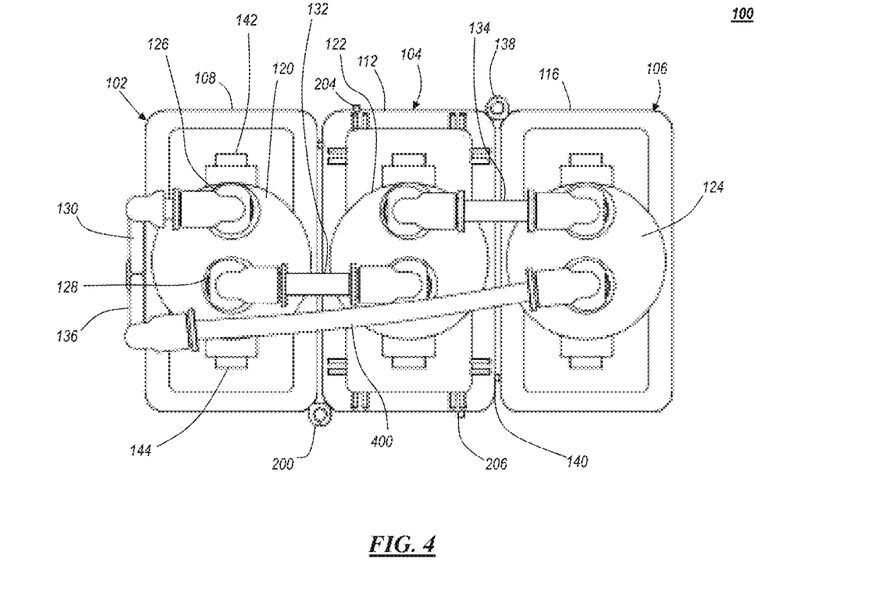
FIG. 4 is a top plan view of a reconfigurable water filter system in a folded compact configuration, in accordance with some embodiments.

FIG. 1 is an elevational side view of a reconfigurable foldable water filter system 100 in an elongated or flat configuration, in accordance with some embodiments. The water filter system 100 allows a user to reconfigure the water system 100 into different volumetric arrangements to fit into different available spaces for installation. That is, the water filter system can be configured into different spatial configurations. In particular, and as shown here, and in FIG. 2, the foldable water filter system 100 can be configured in an elongated or flat configuration. FIGS. 3-4 show the same water filter system 100 folded in a compact configuration, and FIGS. 1-4 show the same water filter system 100, and therefore use the same reference numerals to refer to the features and structures of the water filter system 100.

The water filter system 100 includes a plurality of filter cartridge receivers 102, 104, 106. Each filter cartridge receiver 102, 104, 106 is configured to receive and retain a respective water filter cartridge 110, 114, 118 in a filter bank. Water comes into the filter system through an input tube 130, is routed through each filter cartridge 110, 114, 118 and leaves as filtered water through output tube 136. Each filter cartridge receiver 102, 104, 106 includes a filter cartridge well 108, 112, 116 in which a filter cartridge 110, 114, 118, respectively, is inserted and retained by the filter cartridge receiver 102, 104, 106. Each filter cartridge receiver 102, 104, 106 further includes a connector portion 120, 122, 124, respectively. The connector portions 120, 122, 124 are located on top of the wells 108, 112, 116 of each filter cartridge receiver 102, 104, 106, respectively, and can be integrally formed or molded into the filter cartridge receivers 102, 104, 106. The connecting portions 120, 122, 124 each have an input connector and an output connector, such as input connector 126 and output connector 128 of filter cartridge receiver 102. The connectors 126, 128 are vertically oriented with respect to the well 108 and allow a connected tube to rotate or swivel (i.e. "swivelable") while being connected to the connectors 126, 128.

The filter cartridge receivers 102, 104, 106 are arranged in a series, connected to each other in succession. Thus, for example, filter cartridge receiver 102 is connected to filter cartridge receiver 104, which is in turn connected to filter cartridge receiver 106. In particular, the filter cartridge receivers 102, 104, 106 are connected at corresponding corners of their wells 108, 112, 116, at the outside of their wells 108, 112, 116, such as by a vertically oriented hinge 138. Spacer features such as a raised spacer 140 can be used to abut an adjacent filter cartridge receiver to provide uniformity of orientation in the flat and compact configurations, as will be shown. The hinges such as hinge 138 can be captured hinges, which permanently join the wells together, or they can be designed so that the filter cartridge receivers can be easily separated to reduce or increase the number of filter cartridge receivers in the series.

Just as the filter cartridge receivers 102, 104, 106 are arranged in a series with their respective water filters 110, 114, 118, the water entering the system 100 from input tube 130 travels through each filter unit in series. The filters can all employ the same type of filtration, or they can each provide a different type of filtration for a multi-stage filter system. Thus, input tube 130 is connected to input connector 126, passes through filter 110, then exits through output connector 128 and then travels to filter cartridge receiver 104 through connecting tube 132. After passing through filter 114, the water passes through connecting tube 134 to filter cartridge receiver 106 where it is further filtered by filter 118, whereupon the water leaves the system though output tube 136 to provide drinking water, water for an ice maker, and so on.

The filter cartridges 110, 114, 118 are inserted into the wells 108, 112, 116 from the bottom of the well, and features on the top of the filter cartridges 110, 114, 118 engage corresponding retention features inside the wells 108, 112, 116. These retention features can be released by depressing opposing buttons 142, 144, which move the retaining features of the filter cartridge receiver 102 inside the well 108 out of engagement with the corresponding retaining features at the top of the filter cartridge 110 to allow the filter cartridge 110 to be removed from the well 108 and the filter cartridge receiver 102, as may be necessary to replace filter cartridge 110 with a new filter cartridge.

Figure 2:
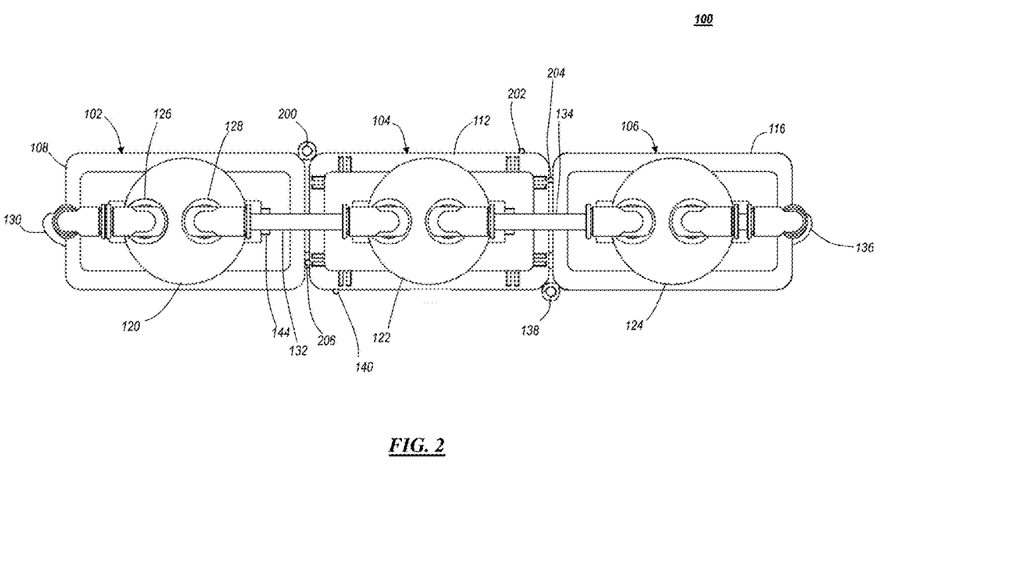
FIG. 2 is top plan view of a reconfigurable foldable water filter system in an elongated or flat configuration, in accordance with some embodiments.

FIG. 2 is top plan view of the reconfigurable water filter system 100 in an elongated or flat configuration, in accordance with some embodiments. In system 100 there are three filter cartridge receivers 102, 104, 106. Filter cartridge receivers 102 and 104 are coupled together by a vertically oriented hinge 200 which is comprised of mating hinge structures at the corresponding corners on the outside of each well 108, 112. As can be seen, the wells 108, 112, 116 are rectangular cuboid shaped, having a rectangular horizontal cross section. It will be appreciated by those skilled in the art that references here to "vertical" and "horizontal" are with respect to the construction of the filter cartridge receivers 102, 104, 106, where the wells 108, 112, 116 are located "below" the connecting portions 120, 122, 124, respectively, implying a vertical relationship. It will be further appreciated that while the filter system 100 can be oriented differently with respect to another device (i.e. a refrigerator), the references to orientation herein are meant to reference orientation with respect to the filter cartridge receivers 102, 104, 106. Thus, if the system 100 were inverted (i.e. with respect to the direction of gravity), the connecting portions 120, 122, 124 would still be considered to be "on top" of their respective wells 108, 112, 116, which each have an opening at the bottom to receive a filter cartridge.

In order to achieve both the flat and folded configurations, each well 108, 112, 116 and each filter cartridge 110, 114, 118 have a rectangular horizontal cross section. That is, two opposing long sides and two opposing short sides at right angles to the long sides, as is known to define a rectangle. In the flat configuration of FIGS. 1 & 2 the filter cartridge receivers 102, 104, 106 are arranged so that a filter cartridge receiver 102, 104, 106 are arrange in a line that is parallel with the long sides of the wells 108, 112, 116, resulting in the short sides being perpendicular to that line and facing a short side of the adjacent filter cartridge receiver well. A spacer 206 on either the outside of filter cartridge receiver 102 or 104 extends outward a distance sufficient to ensure that the abutting short sides between filter cartridge receivers 102 and 104 are substantially parallel when the system 100 is in the flat configuration. Additional spacers 202, 204 can likewise be used for either the flat configuration or the folded configuration.

When there are more than two filter cartridge receivers in the series, as shown here, then the hinges 138, 200 alternate sides at each successive coupling between adjacent and successive filter cartridge receivers in the series. This allows for an accordion type folding movement in configuring the plurality of filter cartridge receivers 102, 104, 106 (which is not needed when there are only two filter cartridge receivers in the series). The elongated configuration of FIGS. 1 & 2 is particularly suited to minimize the dimension of the system 100 in one dimension (i.e. depth) while taking advantage of space available for the other dimension, such as behind a refrigerator, where it is ideal to minimize the depth of the system 100 in the flat configuration as there is ample space available for the length of the system (i.e. from the left side to the right side in FIGS. 1 & 2) but limited depth.

FIG. 3 is an elevational side view of the reconfigurable foldable water filter system 100 in the folded configuration, and FIG. 4 is a top plan view of the foldable water filter system 100 in the folded configuration, in accordance with some embodiments. In the folded configuration, the length of the system is reduced and minimized for locations where the depth of the system 100 do not need to be minimized. For example, in the compact configuration of FIGS. 3 & 4, the system 100 can be located in a compressor access spaces of a built-in refrigerator unit. In FIG. 3 it can be seen that hinge 200 is on the nearer (to the viewer, or the bottom of the page in FIG. 4) side of the system 100, and hinge 138 is on the far side of the system, obscured from view. This is because of the way the filter cartridge receivers 102, 104, 106, as a series, are now folded to achieve the folded configuration. Thus, in the folded configuration, the filter cartridge receivers are arranged in a line such that the short sides of the filter cartridge receivers 102, 104, 106 are all parallel with the line, and the long sides are perpendicular to the line. The line can be a line through, for example, the center of each filter cartridge receiver 102, 104, 106. In FIG. 4 it can be seen that an extended connecting tube 400 is required in embodiments where the input tube 130 and output tube 136 are on the same side of the system 100. In some embodiments, the connecting tube 400 can have a collapsing (e.g. accordion) portion that can be used in either the compact/folded configuration or the flat configuration.

Figure 5:
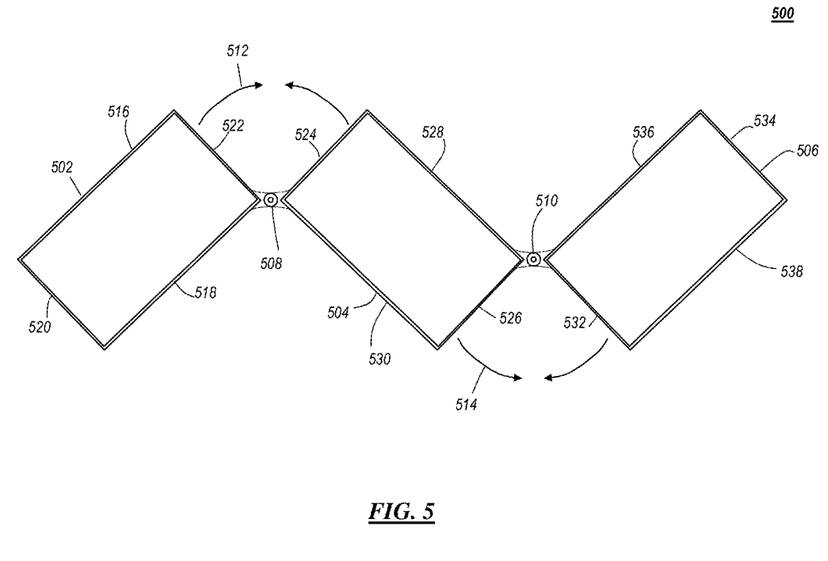
FIG. 5 is a vertical view of a plurality of filter cartridge receiver wells joined in a foldable series and being moved into an elongated or flat configuration, in accordance with some embodiments.
Figure 6:
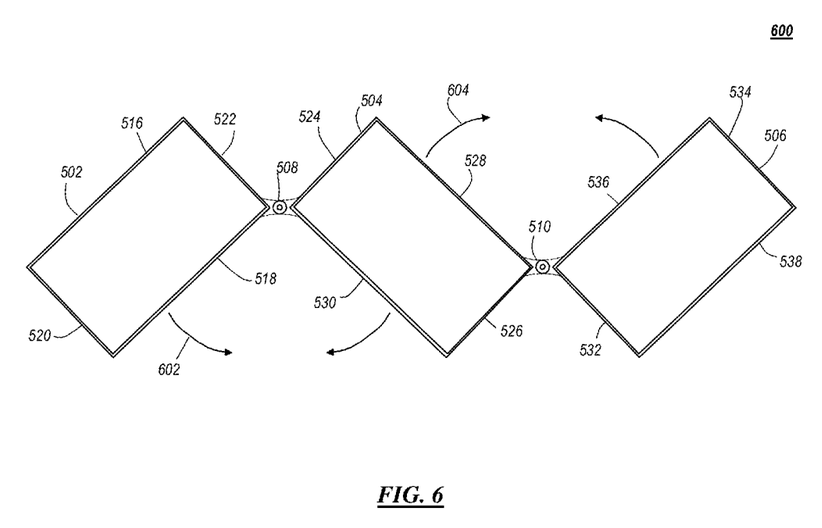
FIG. 6 is a vertical view of a plurality of filter cartridge receiver wells joined in a foldable series and being folded into a compact configuration, in accordance with some embodiments.

FIGS. 5 & 6 show how to arrange the plurality of filter cartridge receivers into the flat and folded configurations, respectively, from an arbitrary configuration. Both FIGS. 5 & 6 show a vertical view of a plurality of filter cartridge receiver wells joined in a series and being moved into the flat configuration, and the folded configuration, in accordance with some embodiments. In this view, a filter cartridge would reside in each well in a direction perpendicular to the page. In both FIGS. 5 & 6 what is seen is the rectangular cross section of filter cartridge receiver wells 502, 504, 506. Wells 502 and 504 are joined at corresponding corners by a hinge 508, and wells 504 and 506 are likewise joined at corresponding corners by a hinge 510. Well 502 includes opposing long sides 516, 518 and opposing short sides 520, 522. Well 504 has opposing long sides 528, 530 and opposing short sides 524, 526. Well 506 has opposing long sides 536, 538 and opposing short sides 532, 534. Hinges 508, 510 are one diagonally opposing corners of well 504, and would be so arranged on any other wells that were included in the series that were not at either end of the series (e.g. wells 502, 506). The alternating location of hinges 508, 510 produces an accordion-like arrangement of the wells 502, 504, 506. To arrange the wells 502, 504, 506 into the flat configuration, the wells 502, 504 are moved such that short sides 522 and 524 of wells 502, 504, respectively, are moved towards each other, about hinge 508, as indicated by arrows 512. Likewise, wells 504 and 506 are moved relative to each other so that short sides 526 and 532 are moved towards each other, as indicated by arrows 514. Similarly, in FIG. 6, to arrange the wells 502, 504, 506 into the folded configuration from an arbitrary configuration, wells 502 and 504 are moved so that long sides 518 and 530 are moved towards each other, as indicated by arrows 602, and wells 504 and 506 are moved relative to each other so that long sides 528 and 536 are moved towards each other about hinge 510, as indicated by arrows 604.

Figure 7:
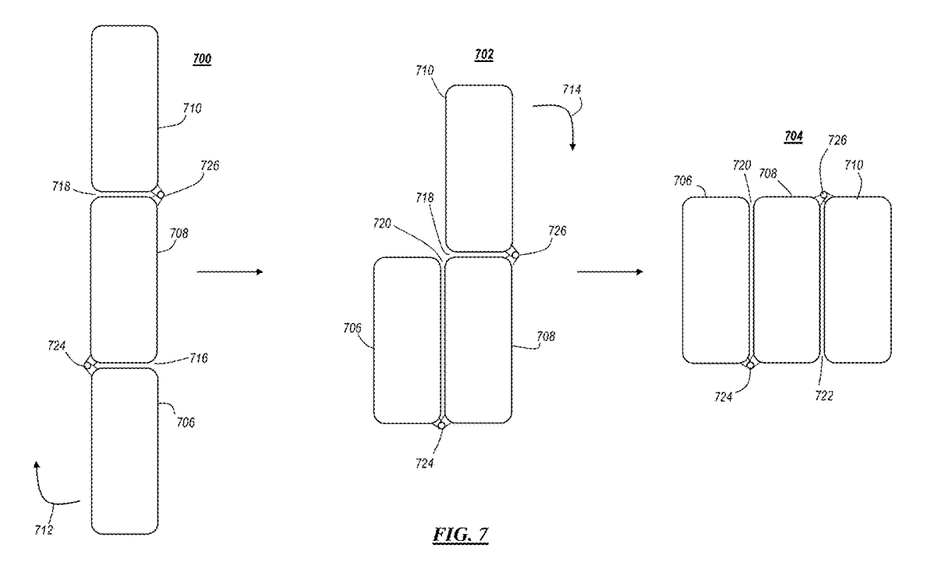
FIG. 7 is a sequence diagram showing vertical view of a plurality of filter cartridge receiver wells joined in a foldable series and being folded from an elongated or flat configuration to a compact configuration, in accordance with some embodiments.

To illustrate more clearly how the filter cartridge receivers can be reconfigured, FIG. 7 shows a sequence diagram of a vertical view of a plurality of filter cartridge receiver wells 706, 708, 710 joined in a series and being reconfigured from a flat configuration to a folded configuration, in accordance with some embodiments. Specifically, the wells 706, 708, 710 are shown on the left in a flat configuration 700, in the middle in an arbitrary configuration 702, and on the right in a folded configuration 704. As in FIGS. 5 & 6, the view here is a vertical view, showing the rectangular horizontal cross section of each well 706, 708, 710. In the flat configuration 700 there is a gap 716 between corresponding short sides of wells 706 & 708, and a gap 718 between the corresponding short sides of wells 708 and 710. The gaps 716, 718 result from the spacing of the hinges 724, 726 required to allow a full one hundred eighty degrees of movement about the hinges by the wells. As shown in FIGS. 1-4 spacers (not shown here) can be provided on the outsides of the wells 706, 708, 710 to maintain the gaps 716, 718 at a consistent gap width between the wells.

To reconfigure the series of filter cartridge receivers from the flat configuration 700 to the folded configuration 704, well 706 can be moved about hinge 724 as indicated by arrow 712, resulting in the arbitrary configuration 702, and producing a different gap 720 between corresponding long sides of wells 706, 708. To complete the reconfiguration, well 710 can be pivoted about hinge 726, as indicated by arrow 714 to produce the folded configuration 704. As a result, another gap 722 is defined between the corresponding long sides of wells 708, 710.

Figure 8:
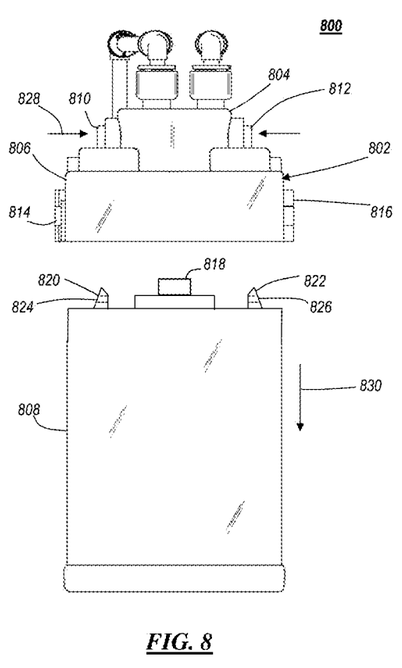
FIG. 8 is an elevational side view of a filter cartridge receiver with a water filter cartridge being removed from the filter cartridge receiver, in accordance with some embodiments.

FIG. 8 is an elevational side view of a single unit of a filter system (e.g. system 100), including a filter cartridge receiver 802 with a water filter cartridge 808 being removed from the filter cartridge receiver 802, in accordance with some embodiments. The filter cartridge receiver 802 includes a connecting portion 804 and a well 806. The filter cartridge 808 can be inserted (vertically) into the well bottom and retained in the well 806. To remove the filter cartridge 808, release buttons 810, 812 can be pressed towards each other, as indicated by arrow 828, to disengage retaining structures coupled to release buttons 810, 812 inside the well 806 from corresponding retaining features 820, 822 on the top of the filter cartridge 808, allowing the filter cartridge 808 to be removed, as indicated by arrow 830. The retaining features 820, 822 can have, for example, transverse openings 824, 826 which allow the retaining features 820, 822 to be engaged to retain the filter cartridge 808 in the well 806. The tops of the retaining features 820, 822 can be ramped to automatically deflect the retaining structures coupled to the release buttons 810, 812 when the filter cartridge 808 is inserted into the well 806. The filter cartridge 808 can further include a connector 818 that interfaces with a corresponding connector inside the well 806 at the top of the well 806. The connector 818 can form a water tight seal, and has an input side through which water is introduced into the filter cartridge 808, and an output side through which filtered water leaves the filter cartridge, as is known. Furthermore, hinges 814, 816, on diagonally opposite corners of the outside of the well 806 can be seen to allow the filter cartridge receiver 802 to be coupled to other filter cartridge receivers as shown in FIGS. 1-7.

Figure 9:
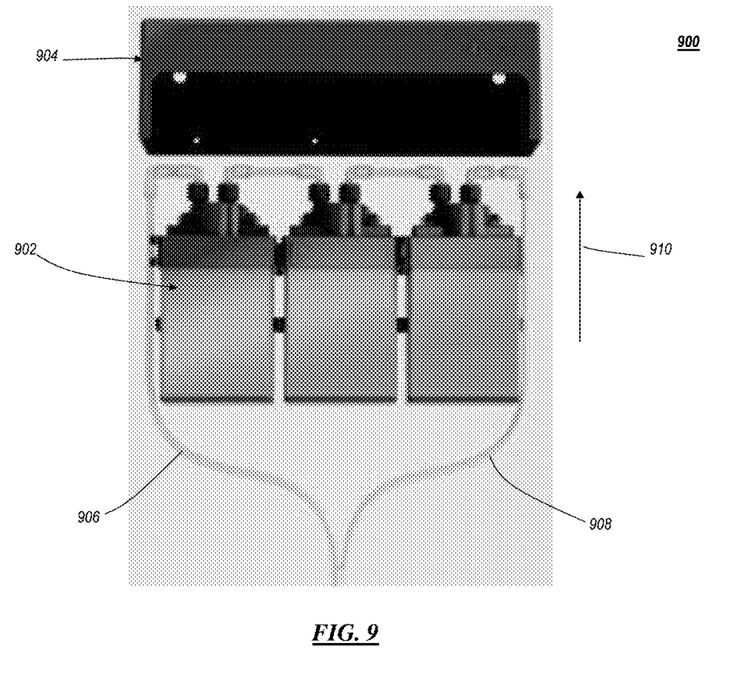
FIG. 9 is an elevational side view of a water filter system including a cover, in accordance with some embodiments.

FIG. 9 is an elevational side view of a water filter system 900 including a cover 904, in accordance with some embodiments. A plurality of filter cartridge receivers are coupled together in a series 902, having an input tube 906 connected to a water source, and an output tube 908 that provides filtered water. The water moves through the various filters in the series by virtue of water pressure created by the water source. The filters can all be identical or they can provide different degrees or types of filtration. For example, in some embodiments, each successive filter in the series, from the input to the output, can filter smaller particles. In that way, the first filter isn't simply doing all the filtering, and the user only needs to change out the filters as needed for the particular type of filtering being done as needed, rather than replacing one large filter. The series 902 of filter units (filter cartridge and filter cartridge receiver) can be placed into the cover 904, as indicated by arrow 910, to protect the connectors and tubes. The cover 904 can be mounted in a desired location to hold the series 902 in place, such as at the back of a refrigerator. A similar cover can be provided for the compact configuration.

A reconfigurable foldable water filter system has been disclosed that provides the benefit of allowing a user to configure or reconfigure the water filter system into an optimized form factor for placing the water filter system in a given location. For example, the inventive water filter system can be configured in an elongated or flattened configuration for mounting the water filter system in narrow spaces. Alternatively, the water filter system can be configured into a compact, folded configuration for other locations. In addition, the use of several filter cartridge receivers connected together in a series allows the filter system to be a multi-stage filter system where each stage of the filter system can provide a different type of filtration, allow for an improved taste when filtering tap water.

What is claimed is:

1. A reconfigurable foldable water filtration system, comprising:
   a plurality of filter cartridge receivers, each filter cartridge receiver having a rectangular horizontal cross section having two opposing long sides and two opposing short sides, and each one of the plurality of filter cartridge receivers being configured to receive a filter cartridge at a bottom of the filter cartridge receiver in a vertical direction;
   the plurality of filter cartridge receivers being joined in a series at corresponding corners of adjacent filter cartridge receiver wells, wherein the filter cartridge receivers are joined in a manner that allows the filter cartridge receivers to move horizontally relative to each other about a joint at the corresponding corners; and
   the plurality of filter cartridge receivers being alternatively configurable in a flat configuration and a folded configuration and moveable between the flat and folded configurations, wherein in the flat configuration the plurality of filter cartridge receivers are arranged in a line with their long sides parallel to the line, and wherein in the folded configuration the plurality of filter cartridge receivers are arranged in line with their short sides parallel to the line.

2. The reconfigurable foldable water filtration system of claim 1, wherein the plurality of filter cartridge receivers comprises at least three filter cartridge receivers.

3. The reconfigurable foldable water filtration system of claim 2, wherein each filter cartridge receiver in the at least three filter cartridge receivers in the series between a first filter cartridge receiver and a last filter cartridge receiver in the series is joined to adjacent ones of the at least three filter cartridge receivers at alternating and diagonally opposing corners in an accordion arrangement.

4. The reconfigurable foldable water filtration system of claim 1, wherein each one of the plurality of filter cartridge receivers has a top portion which includes an input connector and an output connector.

5. The reconfigurable foldable water filtration system of claim 4, wherein the input and output connectors of each filter cartridge receiver are vertically oriented with respect to the filter cartridge well, and are swivelable about a vertical axis.

6. The reconfigurable foldable water filtration system of claim 1, further comprising a spacer formed on an outside of the filter cartridge well on each one of the plurality of filter cartridge receivers, wherein the spacer is positioned on a side of the filter cartridge well opposite the corresponding corner that is joined to another of the plurality of filter cartridge receivers.

7. The reconfigurable foldable water filtration system of claim 1, wherein the filter cartridge receivers are fabricated of a polymeric material.

8. The reconfigurable foldable water filtration system of claim 1, wherein each one of the plurality of filter cartridge receivers has a top portion which includes opposing retention release buttons which are configured to release a filter cartridge being retained in the filter cartridge well.

9. The reconfigurable foldable water filtration system of claim 1, wherein the adjacent filter cartridge receivers in the series are joined by captured hinges.

10. A foldable water filtration system, comprising:
a plurality of filter cartridge receivers, each one of the filter cartridge receivers having a rectangular horizontal cross section, and having adjoining sides extending upwards from a bottom to a top portion, and each filter cartridge receiver being configured to receive a filter cartridge in a vertical direction at the bottom, wherein the sides of each filter cartridge receiver form corners where adjoining sides meet;
wherein the plurality of filter cartridge receivers are joined together in a series by vertically oriented hinge features formed at corresponding ones of the corners on adjacent filter cartridge receivers in the series, allowing the plurality of filter cartridge receivers to move with respect to each other about the hinge features; and
the hinge features that are disposed on the plurality of filter cartridge receivers in an alternating arrangement that allows the plurality of filter cartridge receivers to be reconfigurable horizontally into a flat configuration that maximizes a length of the series, or a folded configuration that minimizes the length of the series.

11. The foldable water filtration system of claim 10, wherein the plurality of filter cartridge receivers comprises at least three filter cartridge receivers.

12. The foldable water filtration system of claim 11, wherein each filter cartridge receiver in the at least three filter cartridge receivers in the series between a first filter cartridge receiver and a last filter cartridge receiver in the series is joined by the hinge features to adjacent ones of the at least three filter cartridge receivers at alternating corners.

13. The foldable water filtration system of claim 10, wherein the top portion of each of the plurality of filter cartridge receivers includes an input connector and an output connector.

14. The foldable water filtration system of claim 13, wherein the input and output connectors are vertically oriented with respect to the filter cartridge well, and are swivelable about a vertical axis.

15. The foldable water filtration system of claim 10, further comprising a spacer formed on an outside of the filter cartridge well on each one of the plurality of filter cartridge receivers, wherein the spacer is positioned on a side of the filter cartridge well opposite the corresponding corner that is joined to another of the plurality of filter cartridge receivers by the hinge features.

16. The foldable water filtration system of claim 10, wherein each of the plurality of filter cartridge receivers are fabricated of a polymeric material.

17. The foldable water filtration system of claim 10, wherein the top portion of each one of the plurality of filter cartridge receivers includes opposing retention release buttons which are configured to release a filter cartridge being retained in the filter cartridge well.

18. A foldable water filtration system, comprising:
a plurality of filter cartridge receivers, each one of the plurality of filter cartridge receivers having a rectangular horizontal cross section and being configured to receive a filter cartridge at a bottom of the filter cartridge receiver in a vertical direction and having a top portion; and
the plurality of filter cartridge receivers being joined together in a series by vertically oriented hinge features at corresponding corners of successive and adjacent ones of the plurality of filter cartridge receivers, the series having ends, and at least one of the plurality of filter cartridge receivers not at the ends that has hinge features at diagonally opposing corners, and wherein the hinge features alternate sides of the plurality of filter cartridge receivers at each successive connection point between filter cartridge receivers in the series.

19. The foldable water filtration system of claim 18, wherein the plurality of filter cartridge receivers are movable about the vertically oriented hinge features to allow the plurality of filter cartridge receivers to be alternatively configured into a flat configuration that maximizes a length of the series, or a folded configuration that minimizes the length of the series.

20. The foldable water filtration system of claim 18, wherein the top portion of each of the plurality of filter cartridge receivers includes an input connector and an output connector.

* * * * *